(12) United States Patent
Makita et al.

(10) Patent No.: US 8,814,375 B2
(45) Date of Patent: Aug. 26, 2014

(54) DISPLAY DEVICE WITH TRANSLUCENT BACKGROUND PANEL

(71) Applicant: Yazaki Corporation, Tokyo (JP)

(72) Inventors: Akihiko Makita, Shimada (JP); Kouhei Takeshita, Shimada (JP); Ayako Yamamoto, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/672,821

(22) Filed: Nov. 9, 2012

(65) Prior Publication Data

US 2013/0114240 A1    May 9, 2013

(30) Foreign Application Priority Data

Nov. 9, 2011  (JP) .................................. 2011-245594

(51) Int. Cl.
| | |
|---|---|
| *G01K 1/06* | (2006.01) |
| *G01D 11/28* | (2006.01) |
| *G01D 13/28* | (2006.01) |
| G01D 13/26 | (2006.01) |
| B60K 37/02 | (2006.01) |
| G01D 7/00 | (2006.01) |

(52) U.S. Cl.
CPC .............. *G01D 13/28* (2013.01); *G01D 13/265* (2013.01); *B60K 2350/1064* (2013.01); *B60K 2350/203* (2013.01); *B60K 37/02* (2013.01); *G01D 7/002* (2013.01)

USPC ................. 362/23.19; 362/23.01; 362/23.18; 362/23.02; 362/23.21

(58) Field of Classification Search
None
See application file for complete search history.

(56) References Cited

U.S. PATENT DOCUMENTS

| | | | |
|---|---|---|---|
| 7,482,915 B2* | 1/2009 | Sumiya et al. ................ 340/461 |
| 2005/0162843 A1* | 7/2005 | Lee et al. ......................... 362/30 |
| 2013/0114240 A1* | 5/2013 | Makita et al. .............. 362/23.19 |

FOREIGN PATENT DOCUMENTS

JP         2009-210302 A       9/2009

OTHER PUBLICATIONS

English machine translation JP 2009-210302 (Mizukoshi et al).*

* cited by examiner

*Primary Examiner* — Natalie Walford
(74) *Attorney, Agent, or Firm* — Sughrue Mion, PLLC

(57) ABSTRACT

A display device including a first light source that emits light, a background panel including a translucent portion to which light emitted from the first light source is entered and from which transmitted light is exited, the translucent portion provided in at least a portion of the background panel; and a dial including a transparent portion to which at least a portion of the transmitted light exited from the translucent portion is entered, the transparent portion provided in at least a portion of the dial.

12 Claims, 5 Drawing Sheets

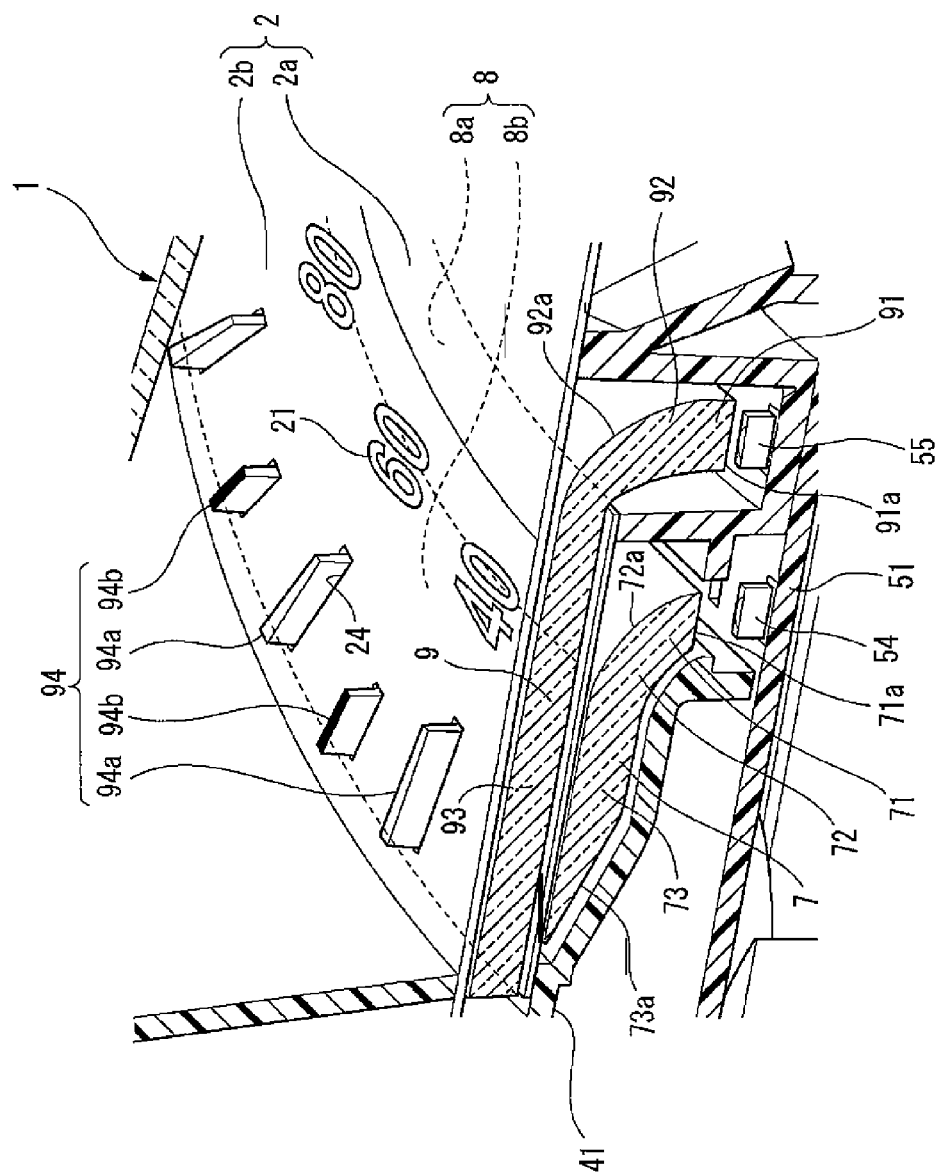

DISPLAY DEVICE WITH TRANSLUCENT BACKGROUND PANEL

BACKGROUND OF THE INVENTION

1. Field of the Invention

The present invention relates to a display device employed for a meter of a vehicle; for instance, an automobile.

2. Description of the Relate Art

A display device employed for a meter of a vehicle, such as an automobile, is for letting a user recognize information by displaying a variety of pieces of information on; for instance, a liquid crystal display portion. Since such a display device is frequently exposed to driver's eyes, superior decoration and design are often required of the display device. In the meantime, there has been proposed a display device intended for enabling a display in a display portion in colors, to thus enhance display quality (see; JP-A-2009-210302).

A display device employed for a meter of a vehicle, like an automobile, is generally designed so as to irradiate a display portion from behind with light emanating from a light source.

In contrast, the display device disclosed in connection with JP-A-2009-210302 has a liquid crystal display portion and a light source for illuminating the liquid crystal display portion by a light guiding body. The light source is made up of a first light source and a second light source that illuminate light in different colors. The light guiding body is split into a first light guiding body and a second light guiding body by a light shielding member that shields the light sources from each other. The first light guiding body includes an irradiation portion for guiding light from each of the first and second light sources to the liquid crystal display portion and an interposition portion that is continuous from the irradiation portion and interposed between the second light guiding body and an end of the light shielding member, and an entire back surface of the liquid crystal display portion. The first light source and the second light source are placed in the first light guiding body, and the first light source is placed in the second light guiding body (see FIG. 2 of JP-A-2009-210302).

By means of the above-mentioned configuration, the display device disclosed in connection with JP-A-2009-210302 uses either a mode for irradiating the first light guiding body with light from the first light source and also irradiating the second light guiding body with the light from the first light source or another mode for irradiating the first light guiding body with light from the second light source and irradiating the second light guiding body with the light from the first light source, in such a way that a right mode is selected in a right situation, thereby enabling switching a display in multiple colors.

However, the display device disclosed in connection with JP-A-2009-210302 is restricted to a display on a surface in multiple colors. In contrast, a display device capable of realizing a display further enhanced in decoration and design has recently been sought.

SUMMARY OF THE INVENTION

The present invention has been conceived in light of the circumstance and aims at providing a display device capable of realizing a display further enhanced in decoration and design.

In order to accomplish the objective, a display device of the present invention has features (1) to (7) provided below.

(1) A display device, comprising:
a first light source that emits light;
a background panel including a translucent portion to which light emitted from the first light source is entered and from which transmitted light is exited, the translucent portion provided in at least a portion of the background panel; and
a dial including a transparent portion to which at least a portion of the transmitted light exited from the translucent portion is entered, the transparent portion provided in at least a portion of the dial.

(2) The display device defined in (1) further comprising a second light source that emits light having different wavelength from the light emitted from the first light source, wherein the light emitted from the second light source is entered to the transparent portion of the dial.

(3) The display device defined in (2) further comprising a first prism for guiding the light emitted from the first light source to the translucent portion of the background panel; and a second prism for guiding the light emitted from the second light source to the transparent portion of the dial.

(4) The display device defined in (3) further comprising a case to which the first prism and the second prism are fixed, wherein the background panel is sandwiched between the first prism and the second prism.

(5) In the display device defined in (1), at least one of a surface of the translucent portion of the background panel to which light emitted from the first light source is entered and another surface of the translucent portion of the background panel from which the transmitted light is exited is provided with at least one of a gradation print and a smoke print.

(6) In the display device defined in (3), the transparent portion of the dial has an opening corresponding to various types of pieces of information to be displayed on the dial; the second prism has a projection that projects from the dial through the opening; and the projection emits at least a portion of the light emitted from the second light source.

(7) In the display device defined in (6), a color layer for permitting transmission of light having a predetermined wavelength is provided on at least a portion of a side surface of the projection that projects from the dial.

In the display device having the configuration defined in (1), when the light emitted from the transparent portion of the dial is visually identified, the translucent portion of the background panel is visually identified as situating behind the transparent portion of the dial in a direction in which the light emitted from the transparent portion exits.

In the display device having the configuration defined in (2), when the light emitted from the transparent portion of the dial is visually identified, the second light source is visually identified in a color differing from that of the translucent portion of the background panel and as situating at a different location in the direction in which the light emitted from the transparent portion exits.

In the display device having the configuration defined in (3), a mount position of the first light source and a mount position of the second light source are arbitrarily selected.

In the display device having the configuration defined in (4), the background panel is fixed to the case by means of the first prism and the second prism.

In the display device having the configuration defined in (5), the transmitted light exiting from the translucent portion of the background panel exits through a layer having a gradation print or a smoke print.

In the display device having the configuration defined in (6), when the light exiting from the projection of the second prism is visually identified, the projection is visually identified as situating in front of the dial in the direction in which the light exiting from the projection exits.

In the display device having the configuration defined in (7), the color of the projection is visually identified in a predetermined color.

The display device of the present invention enables provision of a display device capable of implementing a display with superior decoration and design.

The present invention has been briefly described. Details of the present invention will become much clearer by reading through an embodiment for implementing the present invention, which will be described below, (hereinafter called an "embodiment") by reference to the accompanying drawings.

BRIEF DESCRIPTION OF THE DRAWINGS

FIG. 5 is a perspective view of the display device of the embodiment when obliquely viewed from cross section taken along the line III-III shown in FIG. 1.

DESCRIPTION OF THE PREFERRED EMBODIMENTS

A specific mode of a display device of the present invention is hereunder described by reference to the drawings.

Figure 1:
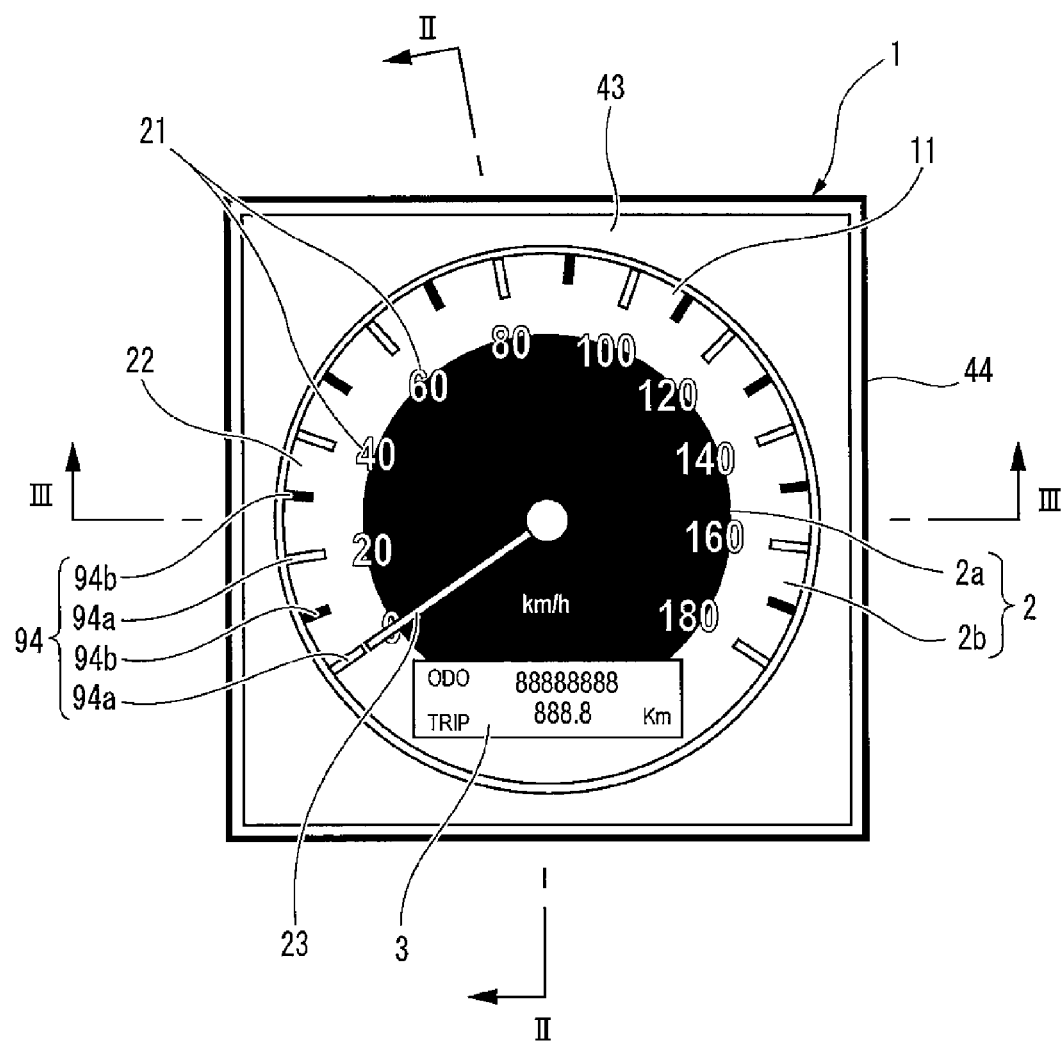
FIG. 1 is a front view of a display device of an embodiment viewed from the front.

FIG. 1 shows a display device 1 employed in a meter for a vehicle, such as an automobile. The display device 1 is equipped with a speed meter 11 that is positioned in a portion of a display area in which the display device 1 displays a variety of pieces of information and that is intended for providing a driver with an indication of a current speed. An appearance of the speed meter 11 is described hereunder by reference to FIG. 1.

The speed meter 11 is equipped with a dial 2, an indicator needle 23, a liquid crystal indicator 3, and a visor 43. The dial 2 is formed from a resin into a disc shape and placed on a front side (a direction toward a viewer of FIG. 1 is hereunder sometimes referred to as a "front," and a direction away from the viewer is referred to as a "back"). A circular-arc speed scale 22 made up of a scale mark area 94 and a numeral area is provided on a front of the dial 2. A numeral area 21 is depicted in white on the front of the dial 2. As will be described later, the scale mark area 94 is formed as a part of a second prism 9 and projects forward from each of holes 24 formed in the dial 2.

The dial 2 has a light shielding area 2a that is given a lightproof print to block passage of light and a transparent portion 2b that is formed from a transparent material and that permits passage of light. The light shielding area 2a is formed concentrically to the dial 2, and the transparent portion 2b is annularly positioned outside of the light shielding area 2a in its radial direction.

The indicator needle 23 is a rod-like member that extends from a neighborhood of a center of the dial 2 to a neighborhood of the scale mark area 94 and that is formed from a translucent material. The indicator needle 23 is positioned in front of the dial 2. A forefront of the indicator needle 23 points a part of the speed scale 22, whereby the speed meter 11 shows a current speed to the driver.

A digital screen of the liquid crystal indicator 3 is exposed from an opening formed in the dial. The liquid crystal indicator 3 displays a trip distance and a total travel distance in numerals on the digital screen.

The visor 43 assumes a cylindrical shape, and the dial 2, the indicator needle 23, and the liquid crystal indicator 3 are accommodated within the cylindrical shape. A front glass 44 is attached to a front end of the visor 43.

Figure 2:
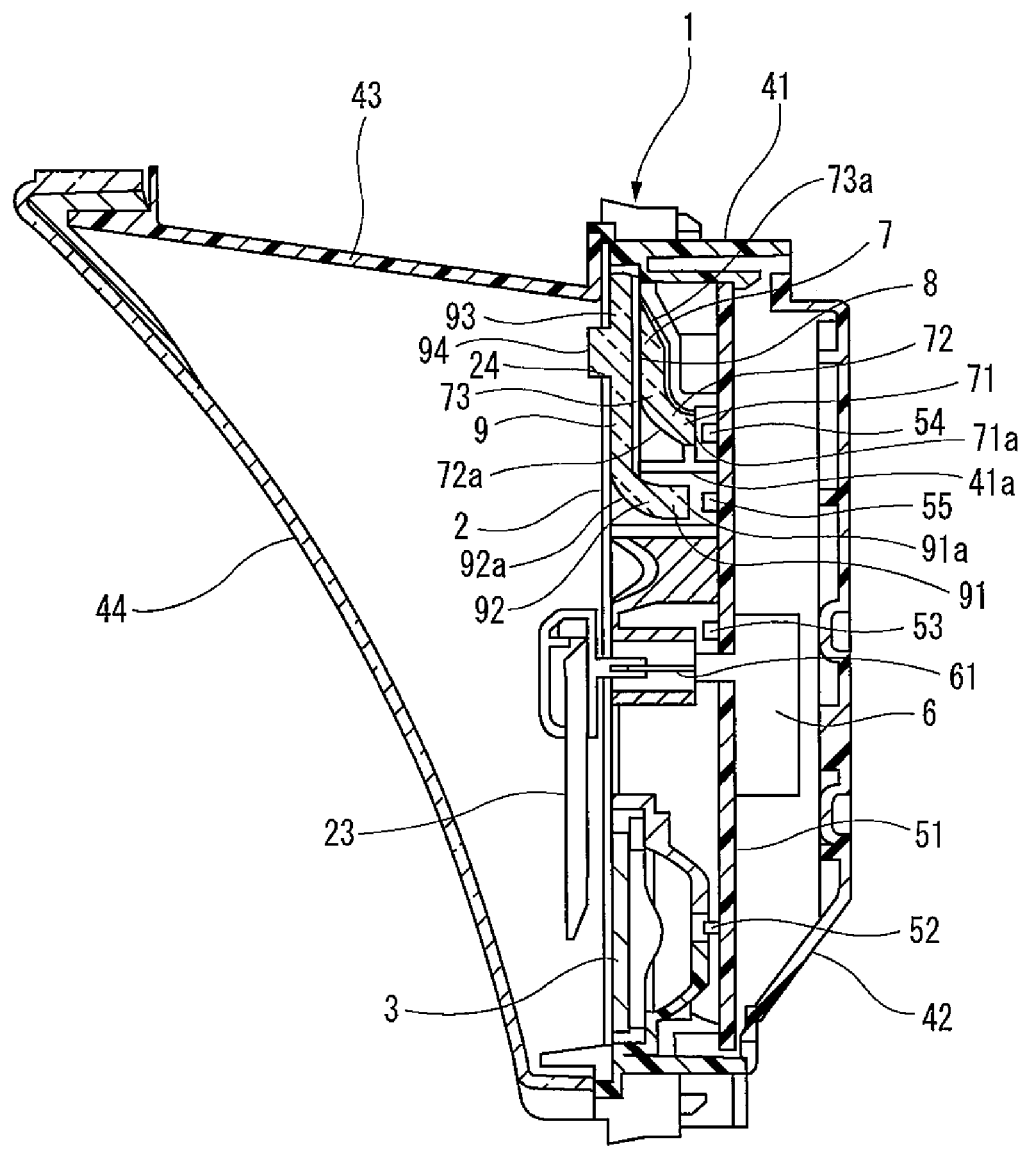
FIG. 2 is a cross section taken along line II-II shown in FIG. 1.
Figure 3:
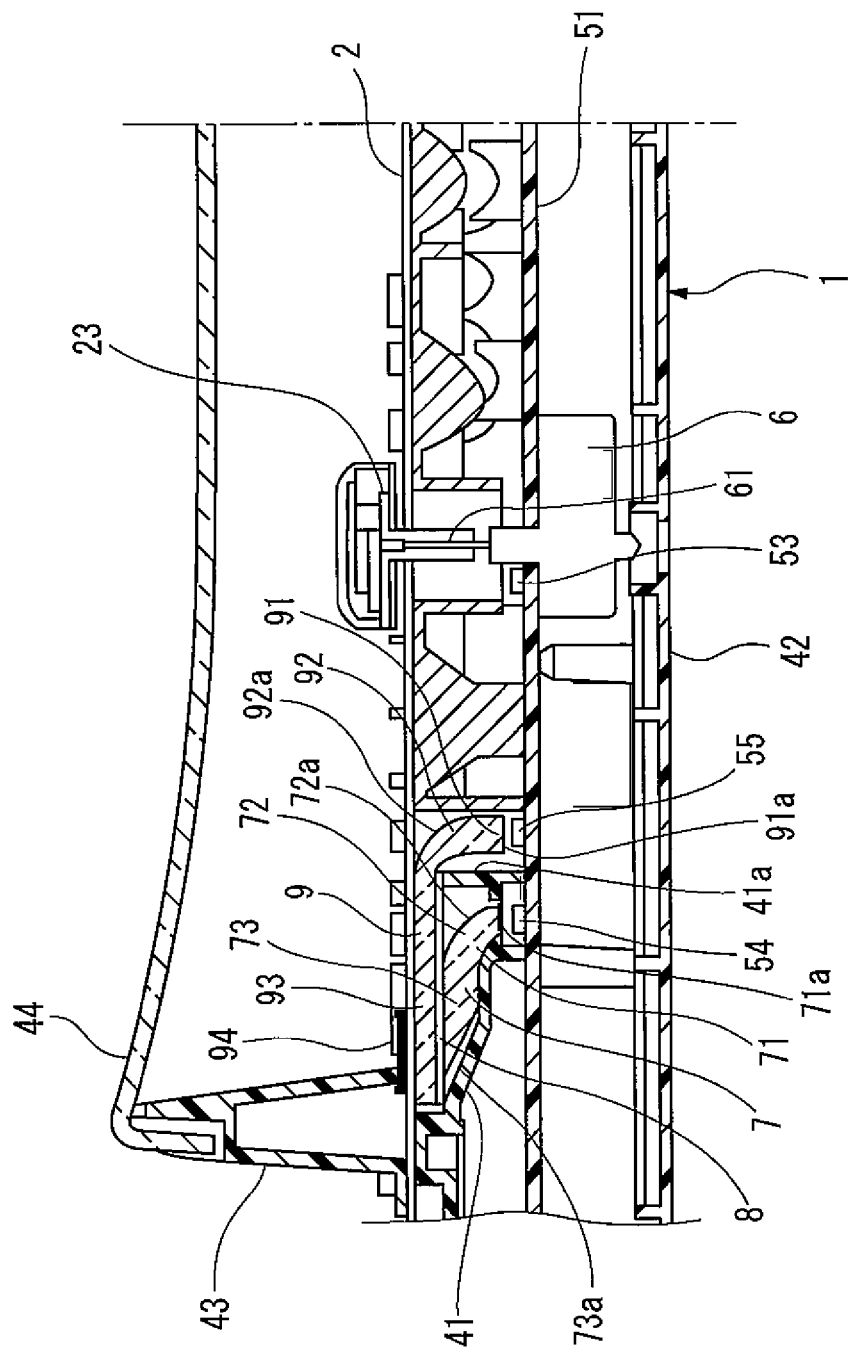
FIG. 3 is a cross section taken along line III-III shown in FIG. 1.

FIG. 2 is a cross section taken along line II-II shown in FIG. 1, and FIG. 3 is a cross section taken along line III-III shown in FIG. 1. The speed meter 11 is covered with a case 41, a rear cover 42, the visor 43, and the front glass 44. An interior of the speed meter 11 covered with the members accommodates the dial 2, the indicator needle 23, a first prism 7, a background panel 8, the second prism 9, a wiring board 51, a light source 52, a light source 53, a first light source 54, a second light source 55, and an internal device 6. An internal structure of the speed meter 11 is hereunder described by reference to FIGS. 2 and 3.

In the speed meter 11, the wiring board 51, the first prism 7, the background panel 8, the second prism 9, and the dial 2 are assembled into the case 41. A configuration of the wiring board 51 is first described.

The wiring board 51 is a member that is formed from a resin into a board whose front face is a board surface. A plurality of light sources 52 to 55 are placed on the board surface of the wiring board 51 so as to be able to shed light in a forward direction. In particular, the first light source 54 is formed from an LED that emits blue light. The second light source 55 is formed from an LED that emits white light. The internal device 6 is fixed to a rear surface of the wiring board 51. The internal device 6 has a step motor (not shown) for actuating the indicator needle 23, and a shaft 61 of the step motor projects forward from the front surface of the wiring board 51. The wiring board 51 is fixed to the case 41 such that a light shielding wall 41a provided on the case 41 comes to an intermediate position between the first light source 54 and the second light source 55.

The first prism 7 is a light guiding member for guiding light emitted from the first light source 54 to a rear surface of the background panel 8. The first prism 7 is equipped with a base portion 71 that extends forward and that has an entrance surface 71a on which the light incident from the first light source 54 falls; a flection 72 that extends from the base portion 71 in a direction curved with respect to the base portion 71 and that has a first slope 72a for reflecting light propagating from the base portion 71 after having fallen on the entrance surface 71a in the direction which the light the base portion is bent; and an irradiation portion 73 that extends continuously from the flection 72 toward the background panel 8 for guiding light to the background panel 8. A second slope 73a for reflecting the light reflected from the first slope 72a further toward the background panel 8 is formed on a rear surface of the irradiation portion 73. A front surface of the irradiation portion 73 is formed into a planar shape.

The first prism 7 is fixed to the case 41 in such a way that a rear surface of any of the base portion 71, the flection 72, and the irradiation portion 73 contacts the case 41 and that the entrance surface 71a faces the first light source. On this occasion, the first prism 7 is positioned and fixed to the case 41 by use of predetermined engagement means. Engagement coming from a fit between members having concave and convex surfaces can be used as the engagement means. In the first prism 7 thus fixed to the case 41, the front surface of the irradiation portion 73 is situated in parallel with a front surface of the dial 2.

The background panel 8 is a plate-like member formed into a circular-arc shape when viewed from the front. The background panel 8 is formed from a translucent material and exhibits translucency.

Figure 4:
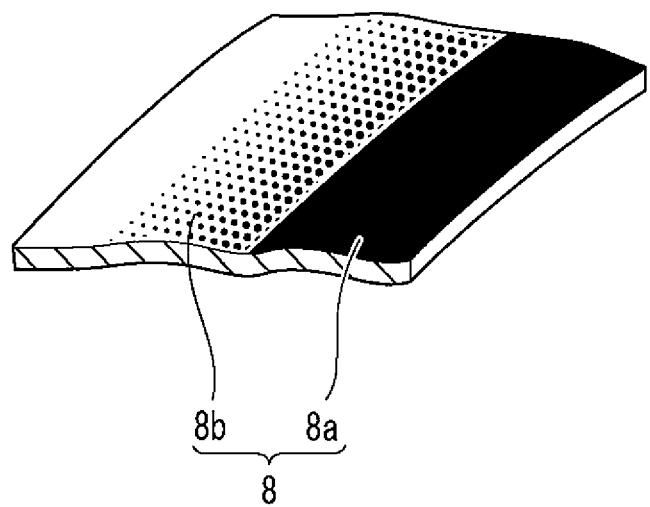
FIG. 4 is a perspective view of a portion of a background panel of the display device of the embodiment acquired when obliquely viewed from the cross section along the line III-III shown in FIG. 1.

FIG. 4 is a perspective view of a portion of the background panel of the display device of the embodiment acquired when obliquely viewed from the cross section along the line III-III shown in FIG. 1. The background panel 8 assumes a circular-arc shape in its entirety and has a light shielding portion 8a that is given a light shielding print and that does not permit passage of light and a translucent portion 8b that permits passage of light. The light shielding portion 8a is an area on a radial inside of the background panel 8 formed into a circular-arc shape. The translucent portion 8b is an area situated on a radial outside of the background panel 8 continuously from an outer edge of the light shielding portion 8a. A front surface of the translucent portion 8b is provided with a gradation print in such a way that colors fade when the transmitted light is viewed toward the radial outside. The gradation print on the front surface of the translucent portion 8b is coated with a smoke print so as to limit an amount of light passed through the translucent portion 8b.

Turning back to FIGS. 2 and 3, a manner of securing the background panel 8 to the case 41 is now described. The background panel 8 is fixed to the case 41 such that a rear surface of the translucent portion 8b faces and contacts the front surface of the irradiation portion 73 of the first prism 7. In the embodiment, the background panel 8 is not only positioned with respect to the case 41 in its front-and-back direction by means of the front surface of the first prism 7 but also positioned and secured to the case 41 in its vertical direction by means of a periphery of the case 41 and a forefront of the light shielding wall 41a (a direction oriented in an upward direction of FIG. 2 is often referred to as an up direction, whilst a direction oriented in a downward direction of FIG. 2 is often referred to as a down direction).

The second prism 9 is a light guiding member for guiding the light emitted from the second light source 55 to a rear surface of the dial 2. The second prism 9 is equipped with a base portion 91 that extends forward and that has an entrance surface 91a on which light incident from the second light source 55 falls; a flection 92 that extends from the base portion 91 in a direction curved with respect to the base portion 91 and that has a first slope 92a for reflecting light propagating from the base portion 91 after having fallen on the entrance surface 91a in the direction of the flection; and an irradiation portion 93 that extends continuously from the flection 92 toward the dial 2 for guiding light to the dial 2. A front surface of the irradiation portion 93 is formed into a planar shape.

A scale mark area 94 that is formed into a rectangular shape and that projects forward from a front surface is formed on the front surface of the irradiation portion 93. The scale mark area 94 includes scale marks 94a and scale marks 94b. A black layer exhibiting a light shielding characteristic is printed on each of front surfaces of the scale marks 94b in the scale mark area 94. A black layer is not printed on the other scale marks 94a of the scale mark area 94. As shown in FIG. 1, the scale marks 94a and the scale marks 94b are positioned on the speed scale 22 one after the other.

The second prism 9 is fixed to the case 41 such that a rear surface of the irradiation portion 93 faces and contacts the front surface of the background panel 8 and that the entrance surface 91a faces the second light source 55. The second prism 9 is positioned and fixed to the case 41 by use of predetermined engagement means. Engagement means used for engaging the first prism 7 with the case 41 can also be used as the engagement means, or another different engagement means can also be used. In the second prism 9 thus fixed to the case 41, the rear surface of the irradiation portion 93 is positioned in parallel with the front surface of the background panel 8, and the front surface of the irradiation portion 93 is positioned in parallel with the front surface of the dial 2. During securing operation, the scale mark area 94 formed on the second prism 9 is inserted into the holes 24 drilled at right angles in the transparent portion 2b of the dial 2, to thus project forward from the front surface of the dial 2. The second prism 9 is thereby positioned and fixed to the dial 2 along a direction parallel to the front surface of the dial 2.

The liquid crystal indicator (TFT-LCD: Thin Film Transistor Liquid Crystal Display) 3 is attached to the rear surface of the dial 2. A diffuser panel is attached to a rear surface of the liquid crystal indicator 3. The diffuser panel diffuses light from the light source 52 provided on the wiring board 51 toward the rear surface of the liquid crystal indicator 3, whereby the liquid crystal indicator 3 is illuminated.

The dial 2 is fixed to the case 41 such that a rear surface of the transparent portion 2b contacts the front surface of the second prism 9 and that the diffuser panel faces the light source 55.

After the dial 2 has been fixed to the case 41, a rotary shaft of the needle indicator 23 is inserted into a hole formed in the center of the dial 2 and joined to the shaft 61 of the step motor. The needle indicator 23 is illuminated by the light source 53 provided on the wiring board 51.

As above, the wiring board 51, the first prism 7, the background panel 8, the second prism 9, and the dial 2 are fixed to the case 41. The first prism 7, the background panel 8, and the second prism 9 are sandwiched between the case 41 and the dial 2 and thereby fixed to the case 41. The background panel 8 is sandwiched between the first prism 7 and the second prism 9 and thereby fixed to the case 41. After securing of these elements, the visor 43 and the rear cover 42 are fixed to the case 41. An upper side of the visor 43 projects forward when compared with a lower side of the same, to thus limit entrance of light into the dial 2 from the above and to thereby assure visibility of the speed meter 11. The front glass 44 whose arch portion is oriented downward to prevent reflected light from traveling forward is fitted to an opening of the visor 43.

A pathway of the light emitted from the first light source 54 and the second light source 55 is now described.

FIG. 5 is a perspective view of the display device of the embodiment when obliquely viewed from cross section taken along the line III-III shown in FIG. 1. FIG. 5 does not show the light shielding print provided on the front surface of the dial 2 for the sake of explanation, and the background panel 8 placed behind the dial 2 is illustrated in a transparent manner. As shown in FIG. 5, the numeral area 21 is depicted in the transparent portion 2b of the dial 2 and disposed in front of the translucent portion 8b of the background panel 8. The holes 24 are formed in the transparent portion 2b of the dial 2 and positioned in front of the translucent portion 8b of the background panel 8. The scale mark area 94 formed on the second prism 9 projects forward from the dial 2 at positions of the holes 24.

The blue light emitted from the first light source 54 enters the entrance surface 71a of the first prism 7. The light incident on the entrance surface 71a undergoes reflection on the first slope 72a and the second slope 73a, thereupon exiting from the front surface of the first prism 7. The emitting light from the front surface of the first prism 7 enters the translucent portion 8b of the background panel 8 and exits from the translucent portion 8b as transmitted light. On this occasion, the transmitted light exits from a layer that is provided on the front surface of the background panel 8 and that has the gradation print and the smoke print. The transmitted light subsequently passes through the second prism 9 and exits from the transparent portion 2b of the dial 2. Specifically, the blue light emitted from the first light source 54 exits from an area of the transparent portion 2b of the dial 2 that is located in front of the translucent portion 8b of the background panel 8.

White light emitted from the second light source 55 enters the entrance surface 91a of the second prism 9. The light incident on the entrance surface 91a exits from the front surface of the second prism 9 after undergoing reflection on the first slope B1. The emitting light from the front surface of the second prism 9 exits from the transparent portion 2b of the dial 2. Specifically, the white light emitted from the second light source 55 exits from the entirety of the transparent portion 2b of the dial 2.

More specifically, the blue light emitted from the first light source 54 and the white light emitted from the second light source 55 exit from the area of the transparent portion 2b of the dial 2 located in front of the translucent portion 8b of the background panel 8. In contrast, only the white light emitted from the second light source 55 exits from the area of the transparent portion 2b of the dial 2 located in front of the light shielding portion 8a of the background panel 8.

After having passed through the first prism 7, the background panel 8, and the second prism 9, the blue light emitted from the first light source 54 exits from respective front surfaces of the scale marks 94a. After having passed through the second prism 9, the white light emitted from the second light source 55 exits from the respective front surfaces of the scale marks 94a. Specifically, the blue light emitted from the first light source 54 and the white light emitted from the second light source 55 exit from the respective front surfaces of the scale marks 94a. Since the black layer exhibiting a light shielding characteristic is printed on the front surfaces of the respective scale marks 94b, the light emitted from the first light source 54 and the second light source 55 do not exit from the front surfaces of the scale marks 94b.

By reference to FIG. 1, explanations are given to how a display on the display device 1 is visually identified.

The light shielding area 2a of the dial 2 is viewed in black. The transparent portion 2b of the dial 2 is transparent and hence visually unidentified. Moreover, although an area behind the transparent portion 2b of the dial 2 through the transparent portion 2b is viewed, a member behind the background panel 8 is not visually identified because the translucent portion 8b of the background panel 8 is provided with the smoke print. For these reasons, the area of the background panel 8 located behind the transparent portion 2b and the second prism 9 are visually identified through the transparent portion 2b.

More specifically, the followings are visually identified through the transparent portion 2b. Namely, the light shielding portion 8a of the background panel 8 is visually identified in black. The translucent portion 8b of the background panel 8 is visually identified in blue and as becoming gradually darker and darker toward the radial outside from the center of the dial 2. The front surface of the second prism 9 is illuminated by white light and visually identified. The front surfaces of the scale marks 94b are visually identified in black.

Operation and effects of the display device 1 of the embodiment are hereunder described.

The display device 1 of the embodiment has the first light source 54 that emits light; the background panel 8 having the translucent portion 8b on which the light emitted from the first light source 54 falls and from which transmitted light exits; and the dial 2 having the translucent area 2b on which the transmitted light exiting from the translucent portion 8b falls.

When the light exiting from the transparent portion 2b of the dial 2 is visually identified, the translucent portion 8b of the background panel 8 is visually identified as situating at a position behind the transparent portion 2b of the dial 2 in the direction in which the light exiting from the transparent portion 2b exits.

As a result, a display that causes the user to recognize a depth becomes feasible, so that a display with much superior decoration and design can be realized.

The display device 1 of the embodiment further includes the second light source 55 that emits light which differs from the light emitted from the first light source 54 in terms of a wavelength. The light emitted from the second light source 55 enters the transparent portion 2b of the dial 2.

When the light emitted from the transparent portion 2b of the dial 2 is visually identified, the second light source is thereby visually identified as being different in color from the translucent portion 8b of the background panel 8 and situating at a position that differs from the location of the translucent portion 8b in the direction in which the light emitted from the transparent portion 2b exits.

As a result, a display for causing the user to recognize a depth to a much greater extent becomes feasible, so that a display with far superior decoration and design can be realized.

The display device 1 of the embodiment further includes the first prism 7 for guiding the light emitted from the first light source 54 to the translucent portion 8b of the background panel 8 and the second prism 9 for guiding the light emitted from the second light source 55 to the transparent portion 2b of the dial 2.

Thereby, locations where the first light source 54 and the second light source 55 are to be placed can arbitrarily be selected by deformation of the first prism 7 or the second prism 9.

As a consequence, a degree of design freedom can be increased.

The display device 1 of the embodiment further includes the case 41 to which the first prism 7 and the second prism 9 are fixed, and the background panel 8 is sandwiched between the first prism 7 and the second prism 9.

The background panel 8 is thereby fixed to the case 41 by means of the first prism 7 and the second prism 9.

Consequently, there is obviated a necessity for a fixing mechanism for fixing the background panel to the case, which enables space and cost saving.

In the display device 1 of the embodiment, the front surface of the translucent portion 8b of the background panel 8 is provided with the gradation print and the smoke print.

The transmitted light exiting from the translucent portion 8b of the background panel 8 thereby exits after having passed through a layer provided with the gradation print or the smoke print.

As a result, a display comes to be indicated with enhanced gradations of color, so that a display with superior decoration and design can be realized.

The display device 1 of the embodiment further includes the second prism 9 for guiding the light emitted from the second light source 55 to the transparent portion 2b of the dial 2. The transparent portion 2b of the dial 2 has the scale mark area 94 corresponding to speed information to be displayed on the dial 2. The scale mark area 94 emits the light emitted from the second light source 55.

When the light exiting from the scale mark area 94 is visually identified, the scale mark area 94 is thereby visually identified as situating in front of the dial 2 in the direction in which the light exiting from the scale mark area 94 exits.

This enables the user to recognize a depth to a much greater extent, so that a display with far superior decoration and design can be realized.

Furthermore, in the display device 1 of the embodiment, the front surfaces of the respective scale marks 94b are printed with the black layer that exhibits a light shielding characteristic.

As a result, the scale marks 94b are visually identified in black.

Consequently, it becomes possible to enable the user to recognize regularity of a predetermined design or color, so that a display with superior decoration and design can be realized.

A technical scope of the present invention is not restricted to the above-mentioned embodiment. The foregoing embodiment can entail various alterations, modifications, and the like, within the technical scope of the present invention.

For instance, in the embodiment, the first light source 54 is formed from an LED that emits blue light, and the second light source 55 is formed from an LED that emits white light. However, the essential requirement for the first light source 54 is to emanate light having a predetermined wavelength belonging to a wavelength domain of visible light, and the essential requirement for the second light source 55 is to emanate light that differs in wavelength from that of the first light source 54.

Although the embodiment is configured so as to employ the first prism 7 and the second prism 9 in order to guide the light emitted from the first light source 54 and the second light source 55 to a predetermined radiation position, the essential requirement is that the light from both the light sources is irradiated to the predetermined radiation position. For instance, there can also be adopted a configuration in which the light from the light source is irradiated directly to the predetermined radiation position.

The embodiment is configured such that the front surfaces of the respective scale marks 94b are printed with the black layer that exhibits a light shielding characteristic. However, there can also be adopted a configuration in which the front surfaces are printed with a color layer that permits passage of light having a predetermined wavelength belonging to the wavelength domain of the visible light. For instance, the front surfaces can also be printed with a color layer that permits transmission of light with a wavelength which is visually identified as a green or blue color.

Moreover, the embodiment is configured such that the color layer is printed only on the front surfaces of the respective scale marks 94b. However, there can also be adopted a configuration in which the color layer is printed on the front surface of the scale mark area 94 and on a portion or entirety of a lateral peripheral surface projecting from the dial 2. This enables the user to recognize a depth, so that a display with superior decoration and design can be realized.

In the embodiment, the scale mark area 94 has the scale marks 94a and the scale marks 94b, and the scale marks 94a and 94b are configured so as to be arranged one after the other on the speed scale 22. However, the essential requirement for the scale mark area 94 is to cause the user to recognize regularity of a predetermined design or color. For instance, there can also be adopted a configuration in which the color layer is printed only on the front surface of the scale mark area 94 that shows 80 km/h or more on the speed scale 22.

The embodiment has adopted the configuration in which the light shielding area 2a is placed on the inner radius side of the dial 2 and in which the transparent portion 2b is placed on the outer radius side of the dial 2. However, the transparent portion can also be placed on the inner radius side of the dial 2, and the light shielding area can also be placed on the outer radius side of the dial 2. In this case, the minimum requirement for the background panel 8 is that the translucent portion of the back ground panel should be placed at a position corresponding to the transparent portion of the dial 2.

Furthermore, the embodiment adopts the configuration in which the front surface of the translucent portion 8b is provided with both the gradation print and the smoke print. The minimum requirement, however, is that either the gradation print or the smoke print be provided on the front surface of the translucent portion 8b. Providing the smoke print makes it possible to prevent deterioration of the design or decoration of the display device 1, which would otherwise be caused when a member placed behind the background panel 8; for instance, the wiring board 51, is visually identified by the user. Moreover, providing the gradation print makes it possible to yield an advantage of causing the user to recognize a stereoscopic effect, or the like, so that the design and decoration of the display device 1 can be enhanced. When compared with a case where either the smoke print or the gradation print is provided, design and decoration of the display device can be enhanced much greater by provision of both the smoke print and the gradation print. Even when only one of the smoke print and the gradation print is provided, the advantage can be independently yielded.

The embodiment has adopted the configuration in which the entire front surface of the translucent portion 8b is provided with the gradation print and the smoke print. However, the front surface of the translucent portion 8b can also be partially provided with the gradation print and the smoke print.

The embodiment adopts the configuration in which the front surface of the translucence portion 8b is provided with the gradation print such that a color of transmitted light undergoes greater attenuation with an increasing distance toward the outer radius. However, the gradation print can also be provided in such a way that the color of the transmitted light becomes dark with an increasing distance toward the outer radial direction.

The embodiment adopts the configuration in which the front surface of the translucent portion 8b is provided with both the gradation print and the smoke print. However, there can also be adopted a configuration in which the rear surface of the translucent portion 8b be provided with the gradation print and the smoke print.

The patent application is based on Japanese Patent Application (JP-2011-245594) filed on Nov. 9, 2011, the subject matter of which is incorporated herein by reference in its entirety.

What is claimed is:

1. A display device, comprising:
   a first light source that emits light;
   a background panel including a translucent portion to which light emitted from the first light source is entered and from which transmitted light is exited, the translucent portion provided in at least a portion of the background panel;
   a dial including a transparent portion to which at least a portion of the transmitted light exited from the translucent portion is entered, the transparent portion provided in at least a portion of the dial;

the background panel being located between the first light source and the dial.

2. The display device according to claim 1, further comprising:
a second light source that emits light having different wavelength from the light emitted from the first light source;
wherein the light emitted from the second light source is entered to the transparent portion of the dial.

3. The display device according to claim 2, further comprising:
a first prism for guiding the light emitted from the first light source to the translucent portion of the background panel; and
a second prism for guiding the light emitted from the second light source to the transparent portion of the dial.

4. The display device according to claim 3, further comprising:
a case to which the first prism and the second prism are fixed, wherein the background panel is sandwiched between the first prism and the second prism.

5. The display device according to claim 1, wherein at least one of a surface of the translucent portion of the background panel to which light emitted from the first light source is entered and another surface of the translucent portion of the background panel from which the transmitted light is exited is provided with at least one of a gradation print and a smoke print.

6. The display device according to claim 3, wherein:
the transparent portion of the dial has an opening corresponding to various types of pieces of information to be displayed on the dial;
the second prism has a projection that projects from the dial through the opening; and
the projection emits at least a portion of the light emitted from the second light source.

7. The display device according to claim 6, wherein a color layer for permitting transmission of light having a predetermined wavelength is provided on at least a portion of a side surface of the projection that projects from the dial.

8. The display device according to claim 2, further comprising a prism for guiding the light emitted from the second light source to the transparent portion of the dial, wherein the prism is located between the background panel and the dial.

9. The display device according to claim 1, further comprising:
a second light source that emits light, wherein the light emitted from the second light source is entered to the transparent portion of the dial;
a first prism for guiding the light emitted from the first light source to the translucent portion of the background panel; and
a second prism for guiding the light emitted from the second light source to the transparent portion of the dial;
wherein the background panel is sandwiched between the first prism and the second prism.

10. The display device according to claim 1, wherein the background panel is a plate member formed of a translucent material.

11. The display device according to claim 10, wherein the background plate is formed in a circular-arc shape.

12. The display device according to claim 11, wherein the background plate includes a light shielding portion and the translucent portion.

* * * * *